United States Patent
Aral et al.

(10) Patent No.: US 8,862,813 B2
(45) Date of Patent: Oct. 14, 2014

(54) METHOD, COMPUTER PROGRAM PRODUCT AND APPARTUS FOR ACCELERATING RESPONSES TO REQUESTS FOR TRANSACTIONS INVOLVING DATA OPERATIONS

(75) Inventors: Ziya Aral, Pompano Beach, FL (US); Roni Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 240 days.

(21) Appl. No.: 12/828,892

(22) Filed: Jul. 1, 2010

(65) Prior Publication Data

US 2012/0005452 A1    Jan. 5, 2012
US 2013/0103922 A9    Apr. 25, 2013

Related U.S. Application Data

(63) Continuation of application No. 11/319,734, filed on Dec. 29, 2005, now Pat. No. 7,752,386.

(51) Int. Cl.
  *G06F 12/10*    (2006.01)
  *G06F 12/08*    (2006.01)
(52) U.S. Cl.
  CPC ................................. G06F 12/0873 (2013.01)
  USPC .......... 711/113; 711/4; 711/206; 711/E12.078
(58) Field of Classification Search
  USPC ................. 711/4, 113, 206, E12.078
  See application file for complete search history.

(56) References Cited

U.S. PATENT DOCUMENTS

| | | |
|---|---|---|
| 5,381,539 A | 1/1995 | Yanai et al. |
| 5,787,304 A | 7/1998 | Hodges et al. |
| 5,933,848 A | 8/1999 | Moenne-Loccoz |
| 6,425,051 B1 | 7/2002 | Burton et al. |
| 6,567,817 B1 | 5/2003 | VanLeer |
| 6,571,259 B1 | 5/2003 | Zheng et al. |
| 6,574,682 B1 | 6/2003 | Chan |
| 6,606,698 B2 | 8/2003 | Fradette |
| 6,629,201 B2 | 9/2003 | Dempsey et al. |
| 6,804,718 B1 | 10/2004 | Pang et al. |
| 7,136,903 B1 | 11/2006 | Phillips et al. |

(Continued)

OTHER PUBLICATIONS

"File Cache Management," (Website: http://msdn.microsoft.com/en-us/library/aa911545.aspx), p. 1, Aug. 28, 2008.
Provisional Application No. 60/187,211.
DataCore Software [online]. DataCore Software Corporation {retrieved Aug. 2, 2000]. Retrieved from the Internet: <URL: http://www.datacoresoftware.com/.

(Continued)

Primary Examiner — Jasmine Song
(74) Attorney, Agent, or Firm — Rader, Fishman & Grauer PLLC (57) ABSTRACT

Responding to IO requests made by an application to an operating system within a computing device implements IO performance acceleration that interfaces with the logical and physical disk management components of the operating system and within that pathway provides a system memory based disk block cache. The logical disk management component of the operating system identifies logical disk addresses for IO requests sent from the application to the operating system. These addresses are translated to physical disk addresses that correspond to disk blocks available on a physical storage resource. The disk block cache stores cached disk blocks that correspond to the disk blocks available on the physical storage resource, such that IO requests may be fulfilled from the disk block cache. Provision of the disk block cache between the logical and physical disk management components accommodates tailoring of efficiency to any applications making IO requests, and flexible interaction with various different physical disks.

23 Claims, 7 Drawing Sheets

(56) References Cited

U.S. PATENT DOCUMENTS

| | | | |
|---|---|---|---|
| 7,200,622 B2* | 4/2007 | Nakatani et al. | 707/823 |
| 7,430,638 B2 | 9/2008 | Kellar | |
| 7,610,445 B1 | 10/2009 | Manus et al. | |
| 2003/0084239 A1 | 5/2003 | Stewart | |
| 2004/0123068 A1* | 6/2004 | Hashimoto | 711/206 |
| 2005/0144396 A1* | 6/2005 | Eschmann et al. | 711/143 |
| 2006/0236060 A1* | 10/2006 | Shitomi et al. | 711/170 |
| 2007/0083656 A1 | 4/2007 | Bobo | |

OTHER PUBLICATIONS

DataCore Software [online]. DataCore Software Corporation {retrieved Aug. 2, 2000]. Retrieved from the Internet: <URL: http://www.datacoresoftware.com/products.shtml.

DataCore Software [online]. DataCore Software Corporation {retrieved Aug. 2, 2000]. Retrieved from the Internet: <URL: http://www.datacoresoftware.com/products/keyfeatures.shtml.

DataCore Software [online]. DataCore Software Corporation {retrieved Aug. 2, 2000]. Retrieved from the Internet: <URL: http://www.datacoresoftware.com/products/specifications.shtml.

DataCore Software [online]. DataCore Software Corporation {retrieved Aug. 2, 2000]. Retrieved from the Internet: <URL: http://www.datacoresoftware.com/products/hardware.shtml.

DataCore Software [online]. DataCore Software Corporation {retrieved Aug. 2, 2000]. Retrieved from the Internet: <URL: http://www.datacoresoftware.com/products/performance.shtml.

DataCore Software [online]. DataCore Software Corporation {retrieved Aug. 2, 2000]. Retrieved from the Internet: <URL: http://www.datacoresoftware.com/products/faqs.shtml.

DataCore Software [online]. DataCore Software Corporation {retrieved Aug. 2, 2000]. Retrieved from the Internet: <URL: http://www.datacoresoftware.com/products/faq_01.shtml.

DataCore Software [online]. DataCore Software Corporation {retrieved Aug. 2, 2000]. Retrieved from the Internet: <URL: http://www.datacoresoftware.com/products/faq_02.shtml.

DataCore Software [online]. DataCore Software Corporation {retrieved Aug. 2, 2000]. Retrieved from the Internet: <URL: http://www.datacoresoftware.com/products/faq_03.shtml.

DataCore Software [online]. DataCore Software Corporation {retrieved Aug. 2, 2000]. Retrieved from the Internet: <URL: http://www.datacoresoftware.com/products/faq_04.shtml.

DataCore Software [online]. DataCore Software Corporation {retrieved Aug. 2, 2000]. Retrieved from the Internet: <URL: http://www.datacoresoftware.com/products/faq_05.shtml.

DataCore Software [online]. DataCore Software Corporation {retrieved Aug. 2, 2000]. Retrieved from the Internet: <URL: http://www.datacoresoftware.com/products/faq_06.shtml.

DataCore Software [online]. DataCore Software Corporation {retrieved Aug. 2, 2000]. Retrieved from the Internet: <URL: http://www.datacoresoftware.com/products/faq_07.shtml.

DataCore Software [online]. DataCore Software Corporation {retrieved Aug. 2, 2000]. Retrieved from the Internet: <URL: http://www.datacoresoftware.com/products/faq_08.shtml.

DataCore Software [online]. DataCore Software Corporation {retrieved Aug. 2, 2000]. Retrieved from the Internet: <URL: http://www.datacoresoftware.com/products/faq_09.shtml.

DataCore Software [online]. DataCore Software Corporation {retrieved Aug. 2, 2000 ]. Retrieved from the Internet: <URL: http://www.datacoresoftware.com/products/faq_10.shtml.

DataCore Software [online]. DataCore Software Corporation {retrieved Aug. 2, 2000]. Retrieved from the Internet: <URL: http://www.datacoresoftware.com/products/faq_11.shtml.

DataCore Software [online]. DataCore Software Corporation {retrieved Aug. 2, 2000]. Retrieved from the Internet: <URL: http://www.datacoresoftware.com/products/faq_12.shtml.

DataCore Software [online]. DataCore Software Corporation {retrieved Aug. 2, 2000]. Retrieved from the Internet: <URL: http://www.datacoresoftware.com/products/faq_13.shtml.

DataCore Software [online]. DataCore Software Corporation {retrieved Aug. 2, 2000]. Retrieved from the Internet: <URL: http://www.datacoresoftware.com/products/faq_14.shtml.

DataCore Software [online]. DataCore Software Corporation {retrieved Aug. 2, 2000]. Retrieved from the Internet: <URL: http://www.datacoresoftware.com/products/faq_why.shtml.

DataCore Software [online]. DataCore Software Corporation {retrieved Aug. 2, 2000]. Retrieved from the Internet: <URL: http://www.datacoresoftware.com/products/faq_what.shtml.

DataCore Software [online]. DataCore Software Corporation {retrieved Aug. 2, 2000]. Retrieved from the Internet: <URL: http://www.datacoresoftware.com/products/faq_who.shtml.

DataCore Software [online]. DataCore Software Corporation {retrieved Aug. 2, 2000]. Retrieved from the Internet: <URL: http://www.datacoresoftware.com/products/downloads.shtml.

DataCore Software [online]. DataCore Software Corporation {retrieved Aug. 2, 2000]. Retrieved from the Internet: <URL: http://www.datacoresoftware.com/sanindustry/links.shtml.

DataCore Software [online]. DataCore Software Corporation {retrieved Aug. 2, 2000]. Retrieved from the Internet: <URL: http://www.datacoresoftware.com/sanindustry/stats.shtml.

DataCore Software [online]. DataCore Software Corporation {retrieved Aug. 2, 2000]. Retrieved from the Internet: <URL: http://www.datacoresoftware.com/services.shtml.

DataCore Software [online]. DataCore Software Corporation {retrieved Aug. 2, 2000]. Retrieved from the Internet: <URL: http://www.datacoresoftware.com/pressroom.shtml.

DataCore Software [online]. DataCore Software Corporation {retrieved Aug. 2, 2000]. Retrieved from the Internet: <URL: http://www.datacoresoftware.com/company.shtml.

DataCore Software [online]. DataCore Software Corporation {retrieved Aug. 2, 2000]. Retrieved from the Internet: <URL: http://www.datacoresoftware.com/contact.shtml.

CMP's TechWeb the IT Network, Tech Encyclopedia [online]. [retrieved Aug. 2, 2000]. The Computer language Co. Inc. [copyright 1998]. Retrieve from teh Internet: <URL:http://www.techweb.com/encyclopedia/defineterm?term=scsi.

CMP's TechWeb The IT Network, Tech Encyclopedia [online]. [retrieved Aug. 2, 2000]. The Computer language Co. Inc. [copyright 1998]. Retrieve from teh Internet: <URL:http://www.techweb.com/encyclopedia/defineterm?term=volume.

CMP's TechWeb the IT Network, Tech Encyclopedia [online]. [retrieved Aug. 2, 2000]. The Computer language Co. Inc. [copyright 1998]. Retrieve from teh Internet: <URL:http://www.techweb.com/encyclopedia/defineterm?term=Tunneling&exact=1.

CMP's TechWeb The IT Network, Tech Encyclopedia [online]. [retrieved Aug. 2, 2000]. The Computer language Co. Inc. [copyright 1998]. Retrieve from teh Internet: <URL:http://www.techweb.com/encyclopedia/defineterm?term=1P%20tunneling.

Cmp's TechWeb The IT Network, Tech Encyclopedia [online]. [retrieved Aug. 2, 2000]. The Computer language Co. Inc. [copyright 1998]. Retrieve from teh Internet: <URL:http://www.techweb.com/encyclopedia/defineterm?term=L%32TP.

SCSI Trade Association Home page [online]. [retrieved Aug. 3, 2000]. Retrieved from the Internet: <URL:http://www.scsita.org/intro.2kJuly3.html.

7 Generations of SCSI [online]. [retrieved Aug. 3, 2000]. Retrieved from the Internet: <URL:http://www.scsita.org/aboutscsi/7gen.html.

SCSI Terms [online]. [retrieved Aug. 3, 2000]. Retrieved from the Internet: <URL:http://www/scsita.org/aboutscsi/terms/scsiterms.html.

SCSI Bibliogrphy [online]. [retrieved Aug. 3, 2000]. Retrieved from the Internet: <URL:http://www.scsita.org/aboutscsi/reads.html.

Larry L. Peterson & Bruce S. Davie, Second Edition, Computer Networks a Systems Approach, pp. 148-151, (C) 2000 by Morgan Kaufman Publishers, San Francisco, California.

SCSI over TCP/IP (IP based SAN). Hewlett-Packard Company (copyright).

IP Storage (ips) [online] [retrieved Feb. 21, 2003]. Retrieved from the Internet; <URL:http://www.ietf.org/html. charters/ips-charter.html.

* cited by examiner

METHOD, COMPUTER PROGRAM PRODUCT AND APPARTUS FOR ACCELERATING RESPONSES TO REQUESTS FOR TRANSACTIONS INVOLVING DATA OPERATIONS

CROSS REFERENCE TO RELATED APPLICATIONS

This application is a continuation of U.S. application Ser. No. 11/319,734, filed on Dec. 29, 2005, now U.S. Pat. No. 7,752,386.

BACKGROUND OF THE INVENTION

1. Field of the Invention

This invention relates generally to responding to input/output requests made by computer applications, and more particularly to accelerating the performance of applications in relation to input/output requests received by an operating system from one or more applications.

2. Description of the Related Art

Computer applications continue to consume and rely upon an increasing amount of computational resources. Significant contributors to application performance include processor speed, memory, network bandwidth, and disk input and output ("I/O", or "IO"). The decreasing cost of storage capacity has helped to ensure that enough storage remains available to applications. Unfortunately, improvements in disk IO performance (the rate at which a system reads data from and writes data to disk drives) have not kept pace with performance improvements in other computational resources, such as processor speed, memory size and speed, and network bandwidth, which improve by orders of magnitude every few years. As a result, many computer bottlenecks are now solely or largely due to inadequate disk IO performance. This, in part, is because mechanical operations are required for a disk drive to perform its tasks that slow performance to mechanical speeds, but these other computational resources operate at electronic speeds.

Various efforts have been made to ameliorate some of the latencies that result when IO requests involve physical storage. Storage caches in external storage subsystems, file system caches, and RAM disks are all well known. Each of these efforts may improve responsiveness at some point in the chain between an application making an IO request and the corresponding physical storage, but the IO performance bottleneck from the perspective of the application persists.

For example, certain storage subsystems external to the computer system employed technologies, each designed specifically for the proprietary subsystem on which it is used (thus, not transferable to commodity systems), that improved the responsiveness of IO requests to the proprietary subsystem's disks. But this improvement only begins after the IO request has "crossed the wire" connecting the computer system to the storage subsystem and it ends when the response from the subsystem to the request again reaches the wire on its way out of the subsystem. The latencies of transport of the request across the wire persist and it does nothing to improve IO performance on the other side of the wire, within the computer system.

RAM disks seek to improve disk IO performance by overcoming the latencies associated with mechanical disk drives. However, they too have problems that make them impractical or inadequate to solve the application IO bottleneck problem. With RAM disks, performance improvements come at a very high cost, making the solution cost prohibitive to most. They are difficult and laborious to implement, because the RAM disk relies upon user configuration or "tuning" of the system. Specifically, the user operates "hotfile" software to identify a list of most frequently accessed files to place on the RAM disk. The user must also manage which files will need to be moved to RAM disk, and the hardware connections to the RAM disk to ensure realization of the available performance improvements. Ongoing tuning is required to optimize RAM disk performance since the files that are currently "hot" may not be the same as those that are hot in the future. Finally, it is not efficient. It speeds IO by being a faster type of disk; it does not have the intelligence to know which applications are most susceptible to bottlenecks or how to improve IO performance based upon the requirements of such applications. Therefore, even though it increases IO speeds, it does so indiscriminately, and is not able to concentrate performance improvement on the IO requests that will have the most impact on the performance of the application.

Finally, the file system cache is useful, but has significant limitations, particularly for storage intensive operations, as the file system cache operates in a different context (files) from that used by the physical disks. Moreover, the file system cache is essentially passive, seeking to store as many files as allocation accommodates, and, like the RAM disk, does not lend itself to efficiency because it is not cognizant of or able to adjust to the specific IO requirements of individual applications.

Accordingly, while there have been various advances in the provision of faster responsiveness to application IO requests, there are many remaining problems and the disk IO performance bottleneck persists.

SUMMARY OF THE INVENTION

The present invention provides systems, methods and apparatus for accelerating the performance of applications.

According to one aspect, the present invention accelerates performance of an application in relation to IO requests made by the application to an operating system in a computing device (e.g., an application server or desktop computer), by providing a disk block cache that is provided in the system memory of the computing device. In one embodiment, this application performance acceleration is accommodated by interfacing with the logical disk and physical disk management components of the operating system of the computing device, and within that pathway providing the system memory-based disk block cache.

Interfacing with the logical disk management component of the operating system identifies logical disk addresses for IO requests made from an application to the operating system. These addresses are translated to physical disk addresses that correspond to disk blocks available on a physical storage resource. The disk block cache stores cached disk blocks that correspond to the disk blocks available on the physical storage resource. Interfacing with the physical disk management component of the operating system accommodates managing the coherence of disk blocks in the disk block cache with the physical storage resource, which may involve management of the exchange of data with the physical storage resource pursuant to maintenance of the disk block cache and fulfillment of the IO requests.

According to another aspect, the interfacing with the logical and physical disk management components is transparent, such that the logical disk management component and the physical disk management component operate as though they were directly interfacing with each other, without the intermediate functionality performed by IO performance acceleration. The proximity of the disk block cache to the host system and the transparent interfacing with the logical and physical disk components with the operating system accommodate IO request responsiveness that is not available with existing systems and techniques, and that traverses the particular requirements of the various applications, as well as the various types of storage, that may be involved in connection with IO requests.

According to another aspect, application performance acceleration accommodates improved responsiveness for IO requests from any number of various applications, and does so transparently through the logical disk management component of the operating system, without requiring a separate configuration for each application. The applications (directly or indirectly such as through an API) merely refer to the logical disk management component of the operating system in the usual fashion and the application performance acceleration functionality expedites IO request responsiveness.

According to still another aspect, the physical storage resources may comprise multiple different disks. Here, managing the exchange of data with the physical storage resource is commonly provided for each of the different disks transparently through the physical disk management component of the operating system, without requiring a customization of the application performance acceleration functionality for individual ones of the different disks.

Provision of the disk block cache in the pathway between the logical disk and physical disk management components of the operating system of the computing device accommodates IO request performance improvement that looks upward to the applications making IO requests and looks downward to the corresponding physical storage. This upward looking aspect to the disk block cache provides a disk block cache that tailors to each application's need, and the downward looking aspect provides a disk block cache that flexibly accommodates interaction with various different physical storage devices to which the computing device may connect.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
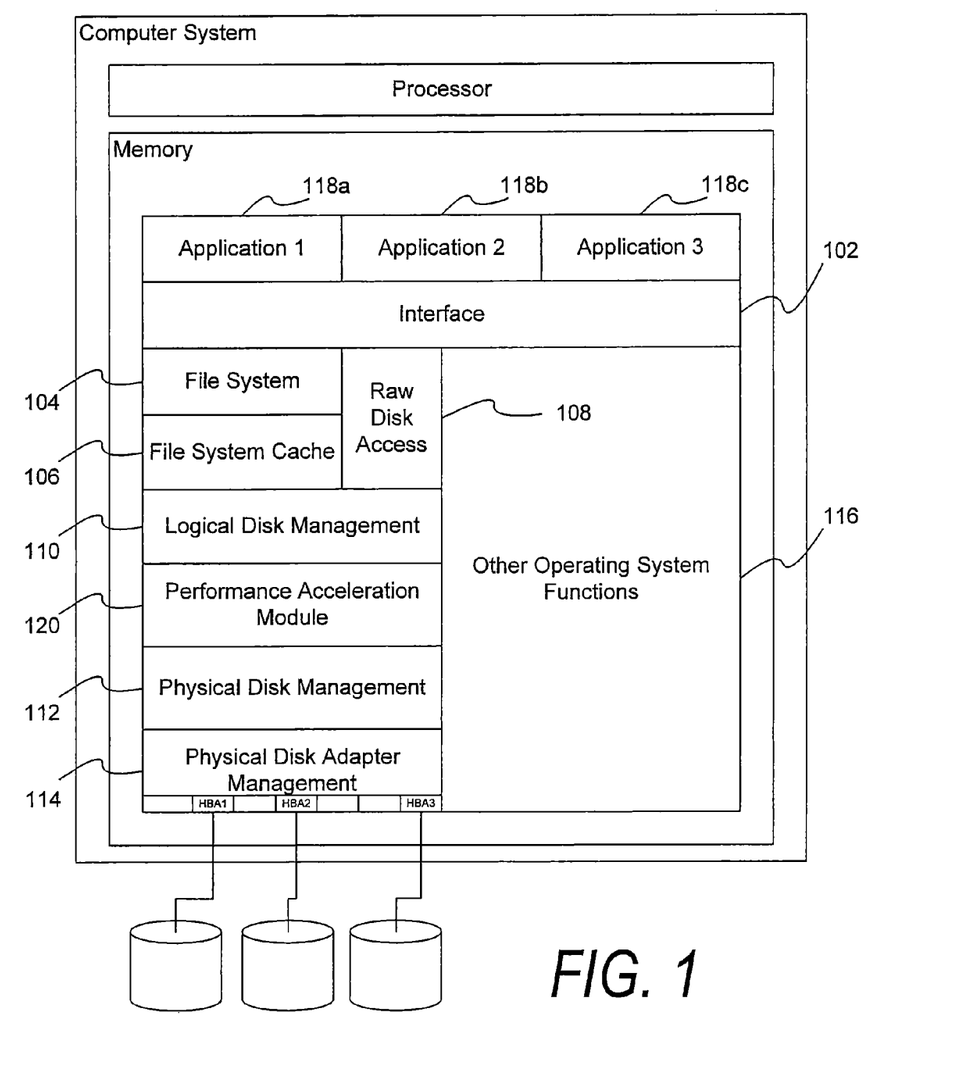
FIG. 1 is a block diagram illustrating a computer system having a performance acceleration module in accordance with the present invention.

FIG. 1 is a block diagram illustrating a computer system 100 having a performance acceleration module 120 in accordance with the present invention. According to one aspect of the present invention, the performance acceleration module 120 interfaces with an operating system and maintains a disk block cache in system memory to expedite the fulfillment of IO requests received by the operating system from one or more applications.

In addition to including a processor and memory, FIG. 1 illustrates the computer system 100 to include a variety of operating system components 102-116 useful in connection with a description of the present invention. In one embodiment, the operating system is a WINDOWS operating system as provided by Microsoft Corporation of Redmond, Wash. (e.g., WINDOWS XP, WINDOWS 2000; WINDOWS 2003 series). Alternative operating systems include but are not limited to those implemented with APPLE computers as provided by Apple Corp., Cupertino, Calif., and UNIX-based systems.

The operating system includes an interface module 102, file system 104, file system cache 106, raw disk access module 108, logical disk management module 110, physical disk management module 112, and a physical disk adapter management module 114. The operating system also includes other functions 116 that need not be delineated herein for an understanding of the present invention.

The interface module 102 accommodates receipt and delivery of instructions from users and applications. With regard to applications, the interface may be embodied as a set of application programming interfaces (APIs) through which requests are made to the operating system, in lieu of a graphical user interface or command interface. As illustrated in the figure, a number of applications 118*a-c* may interface with the operating system. Among the requests made by applications 118*a-c* are IO requests, which include read requests and write requests.

The file system 104 accommodates the naming and logical placement of files for storage and retrieval, typically invoking a number of directories arranged in hierarchical fashion.

The file system cache 106 provides a conventional file system cache, which is an allocated portion of memory that retains recently used information. The size of the cache may depend upon the amount of physical memory available as well as the amount of memory used by installed applications. The file system cache 106 may be fixed or dynamically adjusted by the operating system according to need.

The raw disk access module 108 accommodates alternative storage access. With the operating system, an application may use different ways to access physical storage. One is through the file system 104. The other is to more directly access physical storage through the raw disk access module 108.

The logical disk management module 110 accommodates the creation and management of partitions and logical volumes corresponding to available disks. Interfaces allow that the creation of new partitions and logical drives, as well as formatting and other configuration of created partitions and drives.

The physical disk management module 112 maps logical disks to the physical disks, and the physical disk adapter management module 114 accommodates management of the connections to the actual physical disks. The operating system recognizes the different physical disk entities that are connected via the physical disk management module 112, which basically tracks them as physical disk objects (i.e., it identifies disk blocks). The physical disk adapter module 114 is essentially a set drivers for the particular disk(s) to which the operating system is connected. There may be as many drivers as there are types of connected disks. The module also translates to the language used by the disk. For example, a SCSI interface, may be slightly different from a Fibre channel interface, etc. The physical disk adapter module 114 may also include one or more HBA cards to accommodate the connection to the physical disks.

The performance acceleration (PA) module 120 interfaces with the logical disk management module 110 and the physical disk management module 112 of the operating system, and at that juncture manages a disk block cache that resides within the computer system 100 memory.

Maintenance of the disk block cache includes the management of reads and writes, as well as corresponding physical disk access (pre-fetching and de-staging of blocks). The disk block cache may include as many disk blocks as possible, subject to the limitation of how much memory is allocated to the PA module 120 for the disk block cache. A physical disk block in most modern systems is 512 bytes. The disk block cache may also work with multiples of physical disk blocks to provide consistency and compatibility with the operating system. For example, the disk block cache may implement 4K blocks for compatibility with a file system that uses 4K blocks. In such an embodiment, each 4K block within the disk block cache actually contains 512 byte physical disk blocks.

The PA module 120 also interfaces between logical disk and physical disk management components of the operating system to further expedite storage access rates. In that regard, the expedited fulfillment of IO requests made by an application to an operating system includes interfacing with the logical disk management component of the operating system to identify logical disk addresses for IO requests sent from the application to the operating system. These addresses are then correlated to physical disk addresses that correspond to a plurality of disk blocks available on a physical storage resource. As described, the disk block cache stores a plurality of cached disk blocks that correspond to the plurality of disk blocks available on the physical storage resource. The PA module 120 interfaces with the physical disk management component of the operating system to accommodate managing the exchange of data with the physical storage resource pursuant to maintenance of the disk block cache and fulfillment of the IO requests.

The PA module 120 is preferably a filter class driver that is integrated with the operating system. Although the performance acceleration module is interposed between the logical disk management module 110 and the physical disk management module 112, the interfacing with those components is transparent. Because of this, the logical disk management module 110 does not require modification and operates as though it is directly communicating with the physical disk management module 112, and vice-versa.

Additionally, communications with the logical disk management module 110 and the physical disk management module 112 can respectively made by applications and physical storage resources in traditional fashion. This allows provision of the performance acceleration functionality for different applications and storage resources (e.g., different types of disks) without requiring a modification in the way that the applications and storage resources communicate with the operating system. Even if different HBAs are used for different disk sets, the performance acceleration functionality is still provided without requiring additional modification. That is, the physical disk management module 112 generally interfaces with the HBA components in the usual fashion.

Provision of the disk block cache in the pathway between the logical disk and physical disk management components of the operating system of the computing device accommodates IO request performance improvement that looks upward to the applications making IO requests and looks downward to the corresponding physical storage. This upward looking aspect to the disk block cache provides a disk block cache that tailors to each application's need, and the downward looking aspect provides a disk block cache that flexibly accommodates interaction with various different physical storage devices to which the computing device may connect. The transparent interfacing with the logical and physical disk components with the operating system accommodate IO request responsiveness that is not available with existing systems and techniques, and that traverses the particular requirements of the various applications, as well as the various types of storage, that may be involved in connection with IO requests.

The PA module 120 may reside in various types of computing devices including desktop and laptop computers, servers, digital televisions, network appliances, and others.

Figure 2:
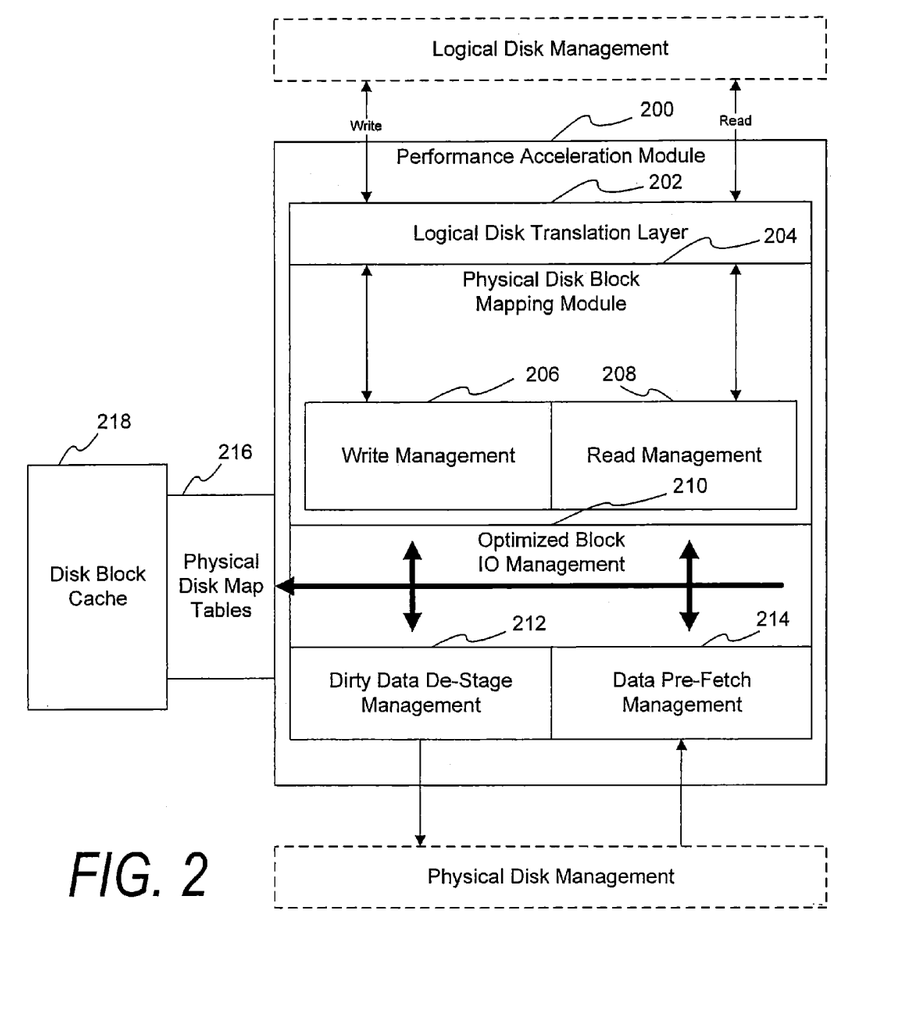
FIG. 2 is a block diagram illustrating an embodiment of a performance acceleration module in accordance with the present invention.

FIG. 2 is a block diagram illustrating an embodiment of a performance acceleration (PA) module 200 in accordance with the present invention.

The PA module 200 runs on a conventional operating system in memory and carries out the described functionality by execution of computer instructions. The artisan will readily recognize the various alternative programming languages and execution platforms that are and will become available, and the present invention is not limited to any specific execution environment.

The PA module 200 is preferably a filter class driver that integrates with the operating system in the described fashion. Although one modular breakdown is described, such is provided by way of example only, as the functionality of the PA module 200 may be provided in any number of alternative designs having greater, fewer or differently named component modules.

The PA module 200 may be variously embodied. In one example, a computer system includes the PA module 200 resident in memory on a conventional computer system, with the PA module 200 including instructions that are executed by a processor. Alternative embodiments include an article of manufacture where the PA module 200 instructions are stored on a computer readable storage medium. The medium may be of any type, including but not limited to magnetic storage media (e.g., floppy disks, hard disks), optical storage media (e.g., CD, DVD), and others. Other embodiments of this aspect of the present invention include computer implemented processes described in connection with the PA module 200 as well as the corresponding flow diagrams.

The PA module 200 includes a logical disk translation layer 202, a physical disk block mapping (PDBM) module 204, a write management module 206, a read management module 208, an optimized block IO management (OBIM) module 210, a dirty data de-stage management (DDSM) module 212, and a data pre-fetch management (DPFM) module 214.

Physical disk map tables 216 and the disk block cache 218 are preferably stored in memory, and managed by the PA module 200 as described. The physical disk map tables 216 are the data structures that maintain coherency and consistency of the data in memory with the data that is (presently or ultimately) on the disks. The disk block cache 218 is the in-memory copy of the most recently read and dirty write data to be de-staged to the disks.

The logical disk translation layer 202 maps file system IO requests that are described according to logical disk addresses into the physical disk addresses. Basically, the top end entry point to the PA module 200 is seen as an IO request to a logical address. The logical disk translation layer 202 translates into a physical address so that other modules can appropriately handle reads and writes and related queuing and removal of the same as described further below.

The PDBM module 204 performs IO request processing. With regard to read requests, the PDBM module 204 does a hash table look up to see whether the requested data is locally available (i.e., in the disk block cache). It also performs single and multiple streaming read analysis for pre-fetch activation from disks. Single stream pre-fetch uses an inference that a number of sequential blocks will be read by an application based upon an existing read pattern. Multiple streaming pre-fetch is an enhancement to single stream, and uses analysis of seemingly random IO requests to identify several distinct sequential block accesses (typically by multiple applications concurrently making IO requests). In contrast to disk controller cache partitioning, which can support multiple streaming pre-fetch, the location of the disk block cache (at the site of the requesting application(s)) and the flexibility and size of the disk block cache potentially support multiple stream pre-fetching that is both more diverse and more efficient than is possible in a disk controller cache.

For write requests, the PDBM module 204 does a hash table look up for write data block reuse, and uses least recently used (LRU) manipulation to allocate write data blocks.

The OBIM module 210 manages the ordering of cached data to support dirty data reuse, pre-fetch, and dirty data queuing. To accommodate the ordering of data, the OBIM module 210 reorders cache blocks and marks data within cache blocks as either valid, valid-dirty or invalid. Generally, valid indicates that whatever is in the cache block is the most recent information and matches the corresponding content on the physical disk. Valid-dirty, which may also be referred to as dirty, means that that there is data in the cache that has not yet been de-staged to the physical disk. Invalid means that a block is in transition and that time must lapse before the relevant block may be read from or written to.

The OBIM module 210 also manages the hash list of LRU and most recently used (MRU) data blocks. It performs read pre-fetching to satisfy predicted read requests and large block write requests to increase throughput. Finally, it dynamically manages the read and write queues to prevent read IO stalls.

The DDSM module 212 and DPFM module 214 respectively handle the actual IO requests to the physical disks. They manage the initiation and completion of IO requests, and coordinate the arrival of read data, and de-staging of dirty write data between the disk block cache 218 and the disks.

Figure 3:
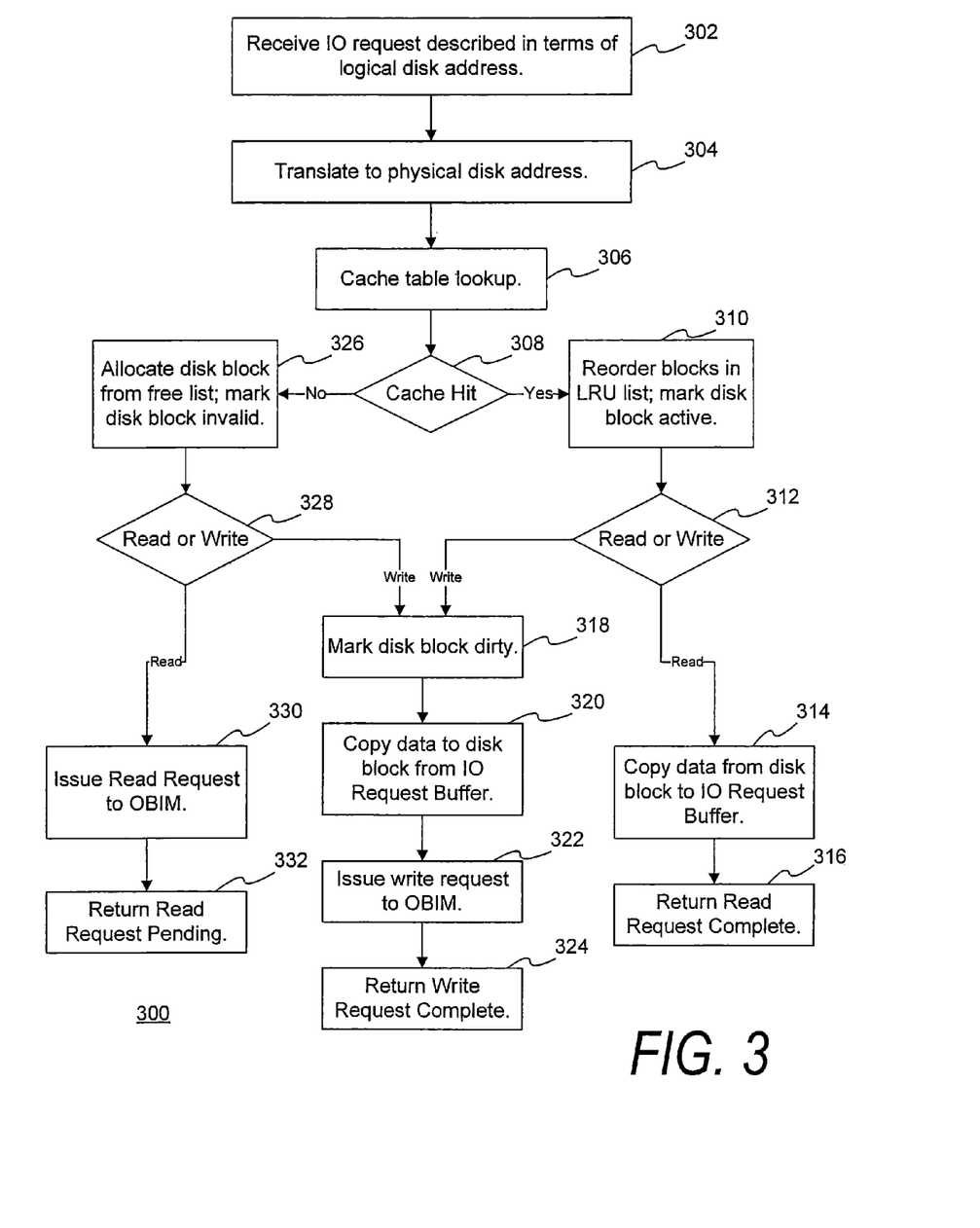
FIG. 3 is a flow diagram illustrating an embodiment of performance acceleration for handling an IO request in accordance with the present invention.

FIG. 3 is a flow diagram illustrating an embodiment of handling an IO request with disk block cache management 300 in accordance with the present invention, such as provided by the previously introduced PDBM module.

The process 300 commences with the receipt 302 of an IO request, which may be a read or a write. The IO request is received in terms of a logical disk address, which is translated 304 to a physical disk address. The physical disk address corresponds a disk block on the physical storage resource. The singular term block is used below for ease of description, although it should be understood that multiple blocks may be involved.

Following determination of the physical disk address, a cache table lookup 306 accommodates a determination whether the corresponding block is resident in the disk block cache. A determination 308 of a cache hit prompts appropriate hash list (LRU, MRU) manipulation and processing of the IO request using the block already found in the cache. Specifically, the hash listing is reordered 310 to reflect that the current block was most recently used.

Then, it is determined 312 whether the IO request is a read or a write. For a read request, the data is copied 314 from the relevant disk block in the disk block cache to an IO Request Buffer. The IO Request Buffer may store and accumulate data corresponding to read requests (as well as write requests). A Read Request Complete indication 316 confirms the completion of the read.

For a write request, the relevant disk block in the cache is marked 318 as dirty. This indicates that, because of the write, the disk block in the cache differs from its counterpart on the physical storage resource (e.g., disk). The IO Request Buffer stores data corresponding to the write request. This data is copied 320 to the relevant disk block in the disk block cache. This disk block remains dirty until it is appropriately de-staged as discussed further below. In association with the management of disk block de-staging, the write request is communicated 322 to the OBIM module. Finally, a Write Request Complete indication 324 confirms the completion of the write.

A cache miss determination 308 means that the relevant disk block is not currently in the cache. The disk block cache has memory allocation for numerous disk blocks, as described. A cache block is allocated 326 from the free list and is marked invalid, since the corresponding disk block has not yet been fetched from the physical storage resource. Following this, if the IO request is determined 328 to be a read, then the read request is issued 330 to the OBIM, which manages the exchange of data (pre-fetching, de-staging, etc.) with the physical storage resource. In the interim, a Read Request Pending indication 332 communicates the need to wait for the retrieval of the relevant disk block and therefore the data corresponding to the read request.

For a write request determination 328, the processing is the same as described above for the cache hit process, wherein the disk block is marked 330 dirty, the data is copied 320 to the disk block in the cache and the write request is issued 322 to the OBIM. The write request will be an integer number of disk blocks. In this situation the disk block in the cache is the new content of what should be on disk. Marking the disk block as dirty essentially marks what is on physical disk as no longer valid (until de-staging).

Figure 4A:
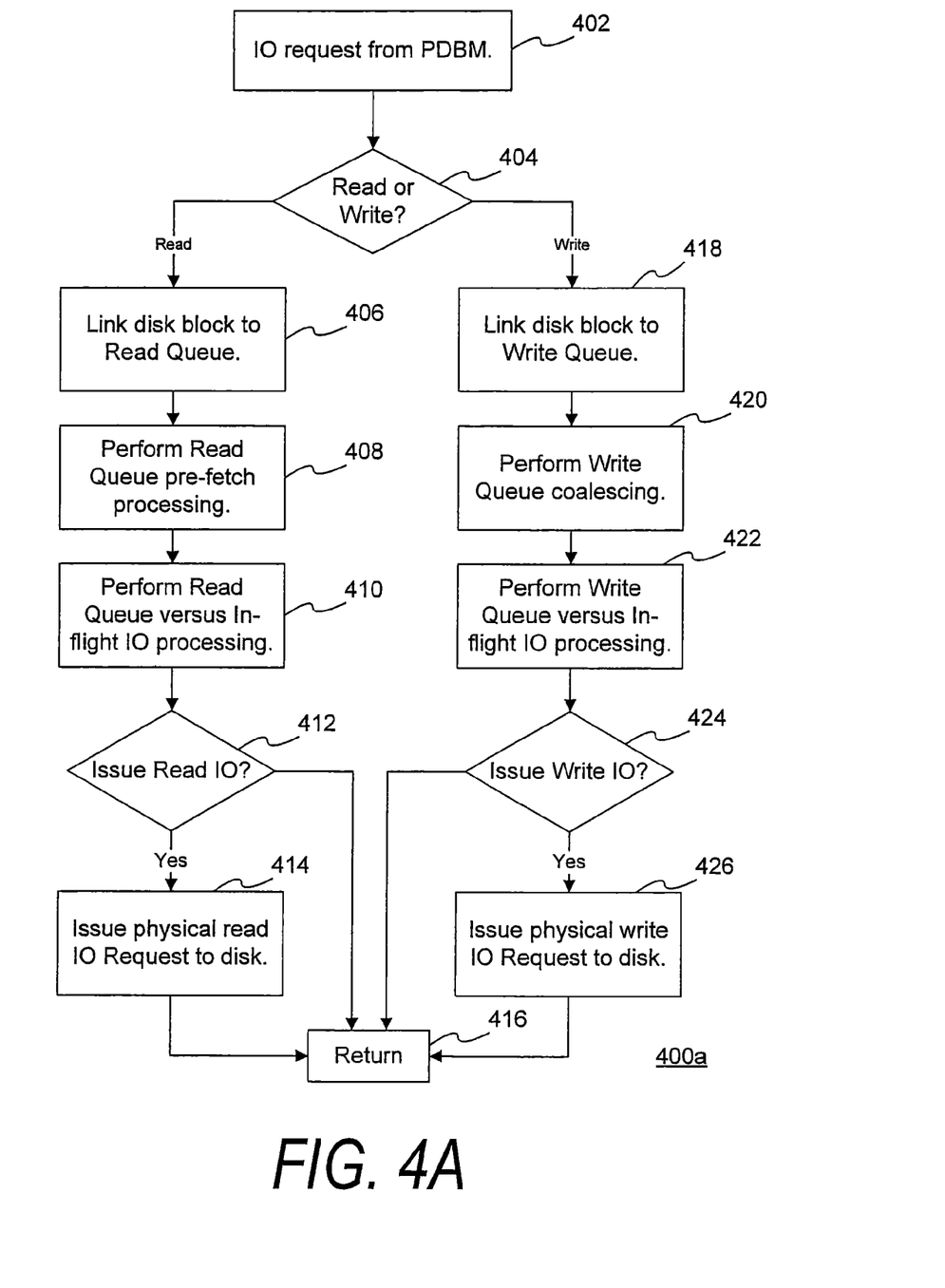
FIGS. 4A-B are flow diagrams illustrating an embodiment of managing a system memory disk block cache pursuant to performance acceleration in accordance with the present invention.
Figure 4B:
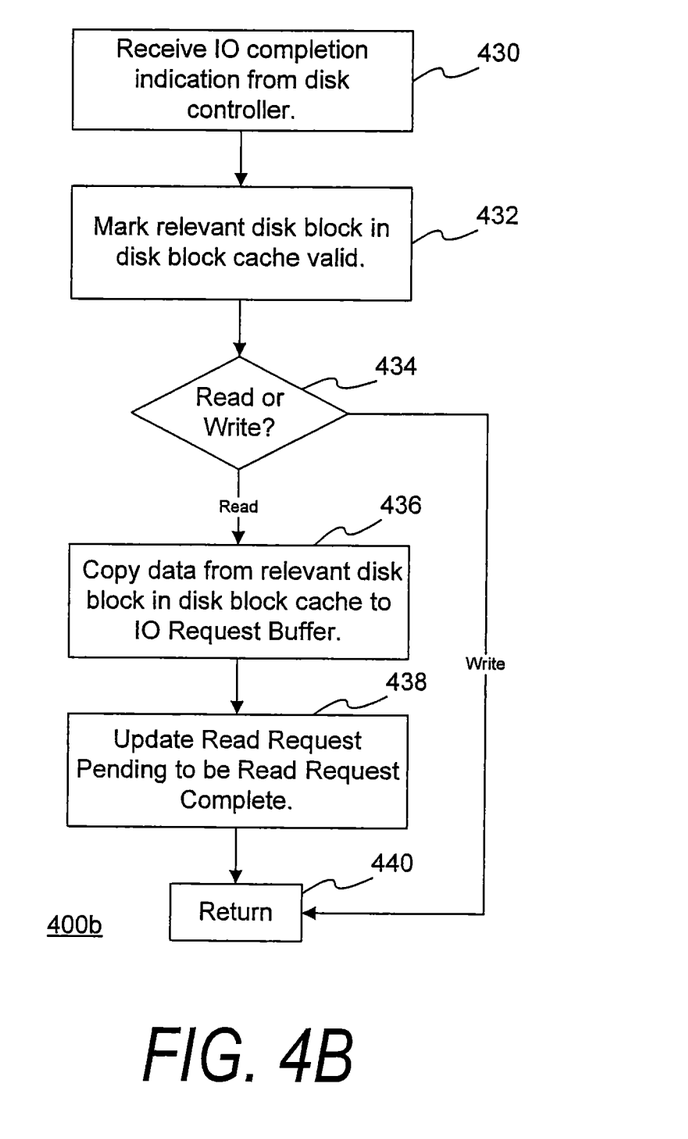

FIGS. 4A-B are flow diagrams illustrating an embodiment of managing the disk block cache in accordance with the present invention. This functionality may be performed by the previously described OBIM module. The OBIM module interfaces with the PDBM module in connection with application-initiated IO requests, and interfaces with physical storage resources (e.g., a disk controller) in connection with completion of IO requests. The corresponding processes 400a, 400b are respectively illustrated in FIG. 4A and FIG. 4B. The OBIM module manages the hash list of LRU and MRU data blocks, performs read pre-fetching to satisfy predicted read requests and large block write requests to increase throughput, and dynamically manages the read and write queues to prevent read IO stalls.

Initially referring to FIG. 4A, following receipt 402 of the IO request, it is determined 404 whether the request is a read or a write. The relevant disk block in the cache is linked 406 to the read queue managed by the OBIM. The read queue generally would fulfill the requests to read disk blocks in the order in which they are received, subject to read queue prefetch processing 408 and read queue versus in-flight IO processing 410 operations. These operations allow disk blocks to be read out of order where it is determined that pre-fetching would be more efficient, and allows in-flight processing to give priority to certain requests. Priority may be given to prevent IO stalls.

If there are reads or writes that are contiguous but in separate requests, they are preferably combined into one read request or write transaction. Priority is also typically leveraged between reads and writes, more than from read to read. Generally, the in-flight processing is biased to a read because of the need for responsiveness to the application. Writes that are going to disk are really completed writes as far as the application is concerned. It is also preferable to ensure that the queue is not filled with a greater number of writes as opposed to reads. This is to avoid having a lot of writes ahead of the read in the queue. To accommodate this, the number of writes in the queue may be limited to a predetermined amount. This can also be configured to be dynamic, where the system increases the write queue limit in the absence of reads, and then returns to the lower limit if reads return.

In lieu of specific algorithms for specific applications, the performance acceleration module of the present invention preferably seeks to satisfy the largest group of applications to give the best overall performance. Although any algorithm may be implemented in accordance with the present invention, it is believed that a basic LRU algorithm may be the most efficient and flexible for most applications.

Subject to these processes, it is determined 412 whether to issue a read IO for the given disk block, whereupon a physical read 10 request is issued 414 to the physical storage resource, or processing returns 416 to consideration of additional operations.

For a write operation determination 404, the relevant disk block in the disk block cache is linked 418 to the write queue. Write queue coalescing 420 accommodates efficient write operations by minimizing the amount of times that actual access to the physical storage resource must be made. Write queue versus in-flight IO processing 422 also accommodates priority to certain IO requests. It is determined 424, similarly subject to such processes, whether to issue a write IO for a given disk block in the cache, whereupon a physical write IO request is issued 426 to the physical storage resource.

Managing the disk block cache in the above-described fashion accommodates a minimization of the number of IO transactions that are issued to the physical storage resource to fulfill the corresponding IO requests processed by the PA module. For example, the write coalescing and read pre-fetching performed by the PA module involve the tracking of IO access patterns so that the IO requests can be combined as part of larger IO transactions that are actually issued to the disk. This provides a reduction in the number of actual IO transactions that are issued to the disk in relation to the IO requests.

This reduction in the number of application IO transactions that are issued to the physical disks translates into better bandwidth utilization of the connecting medium used to access the disk as well more efficient disk access, which reduces mechanical latencies. All IO transactions incur an overhead that includes transmission protocol bandwidth as well as mechanical latencies associated with the disk (head seek and disk rotational latencies). Therefore, the ability to cache many small sized IOs requested by applications into larger sized transactions to the disk helps to improve the overall bandwidth of the connection as well as the throughput of the disk device.

FIG. 4B illustrates processing 400b following completion of the IO transaction by the physical storage resource (e.g., as communicated by a disk controller). Following receipt 430 of an indication of IO completion from the disk controller, the corresponding disk block is marked 432 as valid in the hash listing. For a read operation determination 434, the retrieved disk block now resides in the disk block cache and may be copied 436 to the IO Request Buffer whereupon a Read Request Complete indication may be returned 438, removing the pending status of the read operation as previously described. For a write operation, the presence of the disk block in the disk block cache accommodates write requests to the now valid block, so no operation is required.

Figure 5:
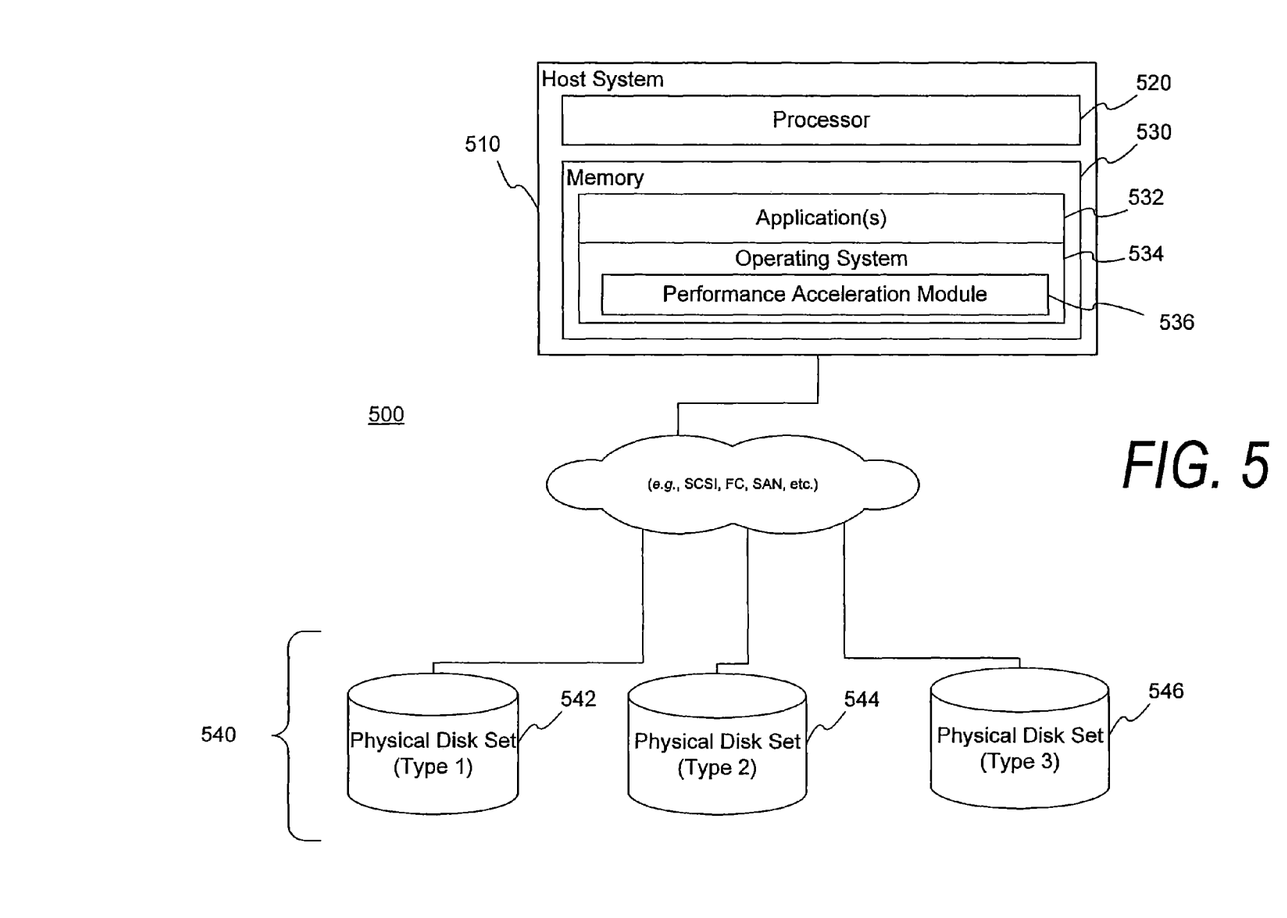
FIG. 5 is a block diagram illustrating an example of a system in which a performance acceleration module operates in accordance with the present invention.

FIG. 5 is a block diagram illustrating an example of a system 500 in which a performance acceleration module operates in accordance with the present invention. A host system 500 is a computer system including a processor 520 and memory 540. The host system 500 includes an operating system 534 such as those previously described, as well as memory 530. Application(s) 632 including but not limited to those for word processing, mathematical calculation, drawing and multimedia content (e.g., video and/or audio) may be provided by the host system 500. The host system 500 may be directly operated by a user. The host system 500 may also be accessed by other computers through a network connection, in which case the host system 500 may also be referred to as an application server.

The host system 500 is also in communication with physical storage 540. Physical storage may include hard disks, optical disks, and other types of storage. The PA module 536 accommodates the expedited fulfillment of IO requests for the host system applications 532. Through the operating system 534, the PA module 536 receives an IO request from an application 532.

The IO request has a logical disk address. The PA module 536 correlates the logical disk address to a physical disk address. The physical disk address corresponds to the physical storage 540, which may include a number of physical disk sets 542-6. The physical storage 540 uses physical disk blocks as a unit of storage. The physical disk address for the IO request will correlate to one or more of these blocks.

The PA module 536 also maintains a disk block cache that stores a plurality of disk blocks that directly correspond to the disk blocks that are stored in physical storage 540. Generally, the PA module 536 determines whether the physical disk block for an IO request is represented among the plurality of disk blocks in the disk block cache. If such is the case, a disk block cache hit results, and the PA module 536 fulfills the IO request for the application without requiring an immediate interaction with the physical storage 540. As described further above, the PA module 536 also preferably uses techniques for managing the disk block cache, as well as corresponding queues for de-staging and pre-fetching in response to various IO requests.

According to another aspect, the PA module 536 accommodates the expedited fulfillment of IO requests in conjunction with systems 500 that include varied physical storage assets, without requiring PA module 536 customization for each particular type of storage to which the system is connected. Rather, any customization in this regard can be provided using configuration of the physical disk management and physical disk adapter management modules, such as through provision of drivers for the particular types of disks in those modules. Thus, the host system 510 is configurable for communication with physical disk sets 542, 544, 546 of different types.

As described previously, the PA module may be resident in desktop, server, and other computing environments. Server embodiments include but are not limited to virtual server solutions (e.g., Microsoft Virtual Server, VMware®); thin-client server solutions (e.g., Citrix® MetaFrame® Presentation Server, Microsoft Terminal Server); messaging and collaboration servers (e.g., IBM Lotus Domino Server); database servers (e.g., Microsoft SQL Server, IBM DB2, etc.); business intelligence servers; web servers (e.g., Microsoft Internet Information Services, Apache HTTP); and cluster servers. Additionally, although certain applications are described herein, it is noted that the PA modules described herein may operate with various applications including but not limited to multimedia applications (e.g., music, movies etc.), video editing, office software suites, database applications, mail and messaging applications, e-commerce and financial applications, web serving and hosting applications, and others.

Figure 6:
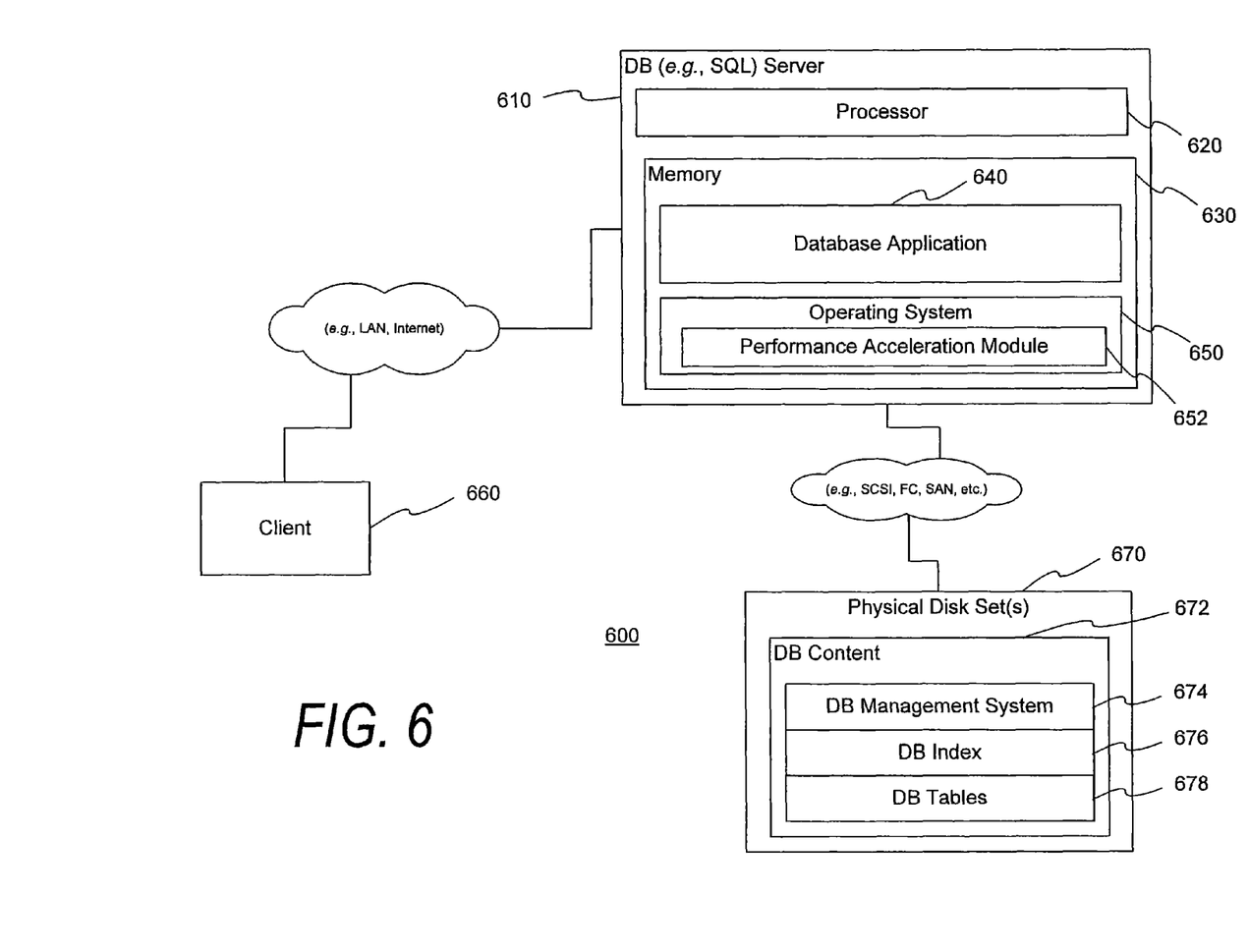
FIG. 6 is a block diagram illustrating another example of a system that includes a SQL server configured to include a performance acceleration module in accordance with the present invention.

FIG. 6 is a block diagram illustrating another example of a system 600 wherein expedited fulfillment of IO requests made by an application is accommodated. Here, the application is a database application. Particularly, the system 600 includes a database server 610 (e.g., a SQL server) that includes a processor 620 and memory 630 to carry out the described functionality. The database server 610 receives requests from a client computer 660 typically through a network connection such as a Local Area Network (LAN) or the Internet. In the Internet example the database server 610 is configured for communication with the client computer 660 using conventional network protocols and related software. The request may, for example, be initiated through a client computer 660 browser. Alternatively, a client computer 660 may initiate a request through a Web server (not shown), which in turn would communicate with the database server 610 to respond to the request. There are various architectures and protocols for receiving and responding to requests for data involving a database. The present invention may be practiced in the context of any such system for receiving and responding to requests for data, including existing systems and those to be developed.

The database server 610 memory 630 is configured to include a data request application 640 and an operating system 650 further configured to include a PA module 652. The PA module 652 includes the features described in connection with FIG. 2 above, and similarly resides in the pathway between the logical and physical disk management components of the operating system 650 to accommodate the provision of expedited responsiveness to IO requests through management of a memory 630 resident disk block cache as described.

The database server 610 is in communication with physical disk set(s) 670 that store the database content 672. The database content 672 includes conventional components such as a database management system 674, a database index 676 and the database tables 678. Typically, the database server 610, and more particularly the data request application 640, responds to a request by accessing the physical disk set(s) 670 to retrieve data contained in the database tables 678, by interfacing with the database management system 674 which in turn uses the database index 676 to organize and access the data.

A known technique for improving database request response times is to use a database cache on the database server 610 system side (i.e., a cache that would reside in the database server 610 memory 630). In this fashion, as much memory as possible is allocated for a cache of the database tables 678, in an effort to avoid the delays associated with retrieving the data from the physical disk set(s) 670 when the data is requested. Unfortunately, systems do not have enough memory to accommodate an entire typical database. There is inevitably a database cache miss and the corresponding cost of physical disk data retrieval.

In lieu of (or in conjunction with) allocating a relatively large database cache dedicated to the contents of the database 672, responsiveness is improved by using available memory 630 for a disk block cache managed by the PA module 652. Allocating memory in this fashion, in conjunction with the features of the PA module 652 in accordance with the present invention, improves on response times that would be provided by a system using a conventional database cache. This is because the PA module 652 generally ameliorates the cost of accessing the physical disk set(s) 670.

Note that the PA module 652 may also work in conjunction with other techniques for improving performance. For example, many database servers perform intermediate operations in temporary database files, with server performance being constrained by the ability to access temporary database files. Implementing these files in conjunction with the PA module 652 allows the performance improvements available through usage of temporary files to be extended by avoiding latencies that would have occurred in the absence of the PA module 652. Similarly, the PA module 652 can operate in conjunction with a system using the file system cache, to alleviate stresses that applications would ordinarily place on the file system cache. For example, for database applications for large, frequently accessed databases the PA module 652 can alleviate table file access delays that would typically be encountered in the absence of the PA module 652.

Thus embodiments of the present invention produce and provide performance acceleration in connection with requests by applications corresponding to physical storage resources. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for accelerating responses to requests for transactions involving data operations, the method comprising:
   presenting from a server device a logical disk having corresponding physical storage resources that are separate from the server device, the logical disk being presented to a client device;
   maintaining a disk block cache corresponding to the logical disk and the physical storage resources within the server device, the cache including blocks of data for the logical disk that are frequently accessed, the cache being resident in a memory having a responsiveness that is faster than a responsiveness of the physical storage resources, the cache being transparent to the client device to which the logical disk is presented;
   receiving from the client device a transaction request that involves a data operation on the logical disk, the transaction request being received through a first network connection with the client device;

satisfying the data operation on the logical disk using the cache; and reconciling the cache with data for the logical disk that is stored on the physical storage resources, through a second network connection with the physical storage devices, the second network connection being external to the server device.

2. The method of claim 1, wherein the server device hosts an application, and the frequently accessed data includes a first tier of data managed by the application at the server device.

3. The method of claim 2, wherein the frequently accessed data does not include a second tier of data that is managed by the application, the second tier of data being absent from the cache and resident on the physical storage resources for access by the application through the second network connection.

4. The method of claim 1, wherein the transaction request is received from one or more applications.

5. The method of claim 1, wherein the memory is a solid state memory that is attached to the server device.

6. The method of claim 1, wherein the first network connection includes at least one of a LAN connection or an Internet connection.

7. The method of claim 6, wherein the second network connection implements a SCSI protocol.

8. The method of claim 6, wherein the second network connection implements a Fibre Channel (FC) protocol.

9. A computer program product for accelerating responses to requests for transactions involving data operations, the computer program product comprising a non-transitory computer readable medium having program code stored thereon, the program code being executable to perform operations comprising:

presenting from a server device a logical disk having corresponding physical storage resources that are separate from the server device, the logical disk being presented to a client device;

maintaining a disk block cache corresponding to the logical disk and the physical storage resources within the server device, the cache including blocks of data for the logical disk that are frequently accessed, the cache being resident in a memory having a responsiveness that is faster than a responsiveness of the physical storage resources, the cache being transparent to the client device to which the logical disk is presented;

receiving from the client device a transaction request that involves a data operation on the logical disk, the transaction request being received through a first network connection with the client device;

satisfying the data operation on the logical disk using the cache; and reconciling the cache with data for the logical disk that is stored on the physical storage resources, through a second network connection with the physical storage devices, the second network connection being external to the server device.

10. The computer program product of claim 9, wherein the server device hosts an application, and the frequently accessed data includes a first tier of data managed by the application at the server device.

11. The computer program product of claim 10, wherein the frequently accessed data does not include a second tier of data that is managed by the application, the second tier of data being absent from the cache and resident on the physical storage resources for access by the application through the second network connection.

12. The computer program product of claim 9, wherein the transaction request is received from one or more applications.

13. The computer program product of claim 9, wherein the memory is a solid state memory that is attached to the server device.

14. The computer program product of claim 9, wherein the first network connection includes at least one of a LAN connection or an Internet connection.

15. The computer program product of claim 14, wherein the second network connection implements a SCSI protocol.

16. The computer program product of claim 14, wherein the second network connection implements a Fibre Channel (FC) protocol.

17. A server apparatus for accelerating responses to requests for transactions involving data operations, the apparatus comprising:

a processor; and a memory, the memory storing program code executable by the processor to perform operations comprising presenting from the server apparatus a logical disk having corresponding physical storage resources that are separate from the server apparatus, the logical disk being presented to a client device;

maintaining a disk block cache corresponding to the logical disk and the physical storage resources within the server apparatus, the cache including blocks of data for the logical disk that are frequently accessed, the cache being resident in a memory having a responsiveness that is faster than a responsiveness of the physical storage resources, the cache being transparent to the client device to which the logical disk is presented;

receiving from the client device a transaction request that involves a data operation on the logical disk, the transaction request being received through a first network connection with the client device;

satisfying the data operation on the logical disk using the cache; and reconciling the cache with data for the logical disk that is stored on the physical storage resources, through a second network connection with the physical storage devices, the second network connection being external to the server apparatus.

18. The server apparatus of claim 17, wherein the server apparatus hosts an application, and the frequently accessed data includes a first tier of data managed by the application at the server apparatus.

19. The server apparatus of claim 18, wherein the frequently accessed data does not include a second tier of data that is managed by the application, the second tier of data being absent from the cache and resident on the physical storage resources for access by the application through the second network connection.

20. The server apparatus of claim 17, wherein the memory is a solid state memory that is attached to the server apparatus.

21. The server apparatus of claim 17, wherein the first network connection includes at least one of a LAN connection or an Internet connection.

22. The server apparatus of claim 21, wherein the second network connection implements a SCSI protocol.

23. The server apparatus of claim 21, wherein the second network connection implements a Fibre Channel (FC) protocol.

* * * * *